United States Patent

[11] 3,633,416

[72] Inventors John Van Dyke;
Albert R. Milliroj, both of Columbus, Ohio
[21] Appl. No. 35,323
[22] Filed May 7, 1970
[45] Patented Jan. 11, 1972
[73] Assignee Columbia Gas System Service Corporation
New York, N.Y.

[54] METHOD AND APPARATUS FOR CONTROLLING AND METERING GAS FLOW
12 Claims, 3 Drawing Figs.
[52] U.S. Cl. .................................................. 73/199, 73/207
[51] Int. Cl. .................................................. G01f 1/04
[50] Field of Search ........................................ 73/199, 227, 207, 210, 194; 137/487

[56] References Cited
UNITED STATES PATENTS
2,100,978 11/1937 Rheinlander ................. 73/199
2,606,445 8/1952 Eckman ....................... 73/207

Primary Examiner—Jerry W. Myracle
Attorney—Curtis, Morris & Safford

ABSTRACT: A system is disclosed for metering the flow of gas which includes a pressure-control regulator through which gas flows from the supply line to an intermediate line, and a metering regulator through which the gas flows from the intermediate line to the discharge line. The gas pressure in the supply line varies, but is always greater than that in the discharge line which must be maintained constant. The pressure-control regulator maintains a predetermined intermediate pressure in the intermediate line, i.e., a pressure somewhat higher than the pressure in the discharge line. The metering regulator has a valve element, the position of which is moved between its fully closed and fully open positions to control the rate of gas flow through the metering regulator and thereby maintain the predetermined pressure in the discharge line. An electrical transducer is coupled to the movable valve element and transmits an electrical signal to an electrical integrator and recording system. The transducer electrical signal is a function of the position of the movable valve element, and is indicative of the rate at which gas is flowing through the metering regulator. That signal is combined with time by the integrator and recording system to produce a readout of the total volume of gas supplied through the discharge line.

PATENTED JAN 11 1972  3,633,416
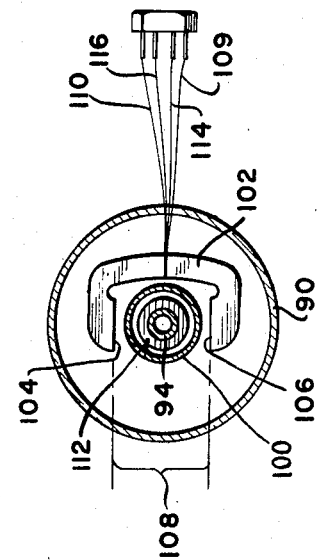
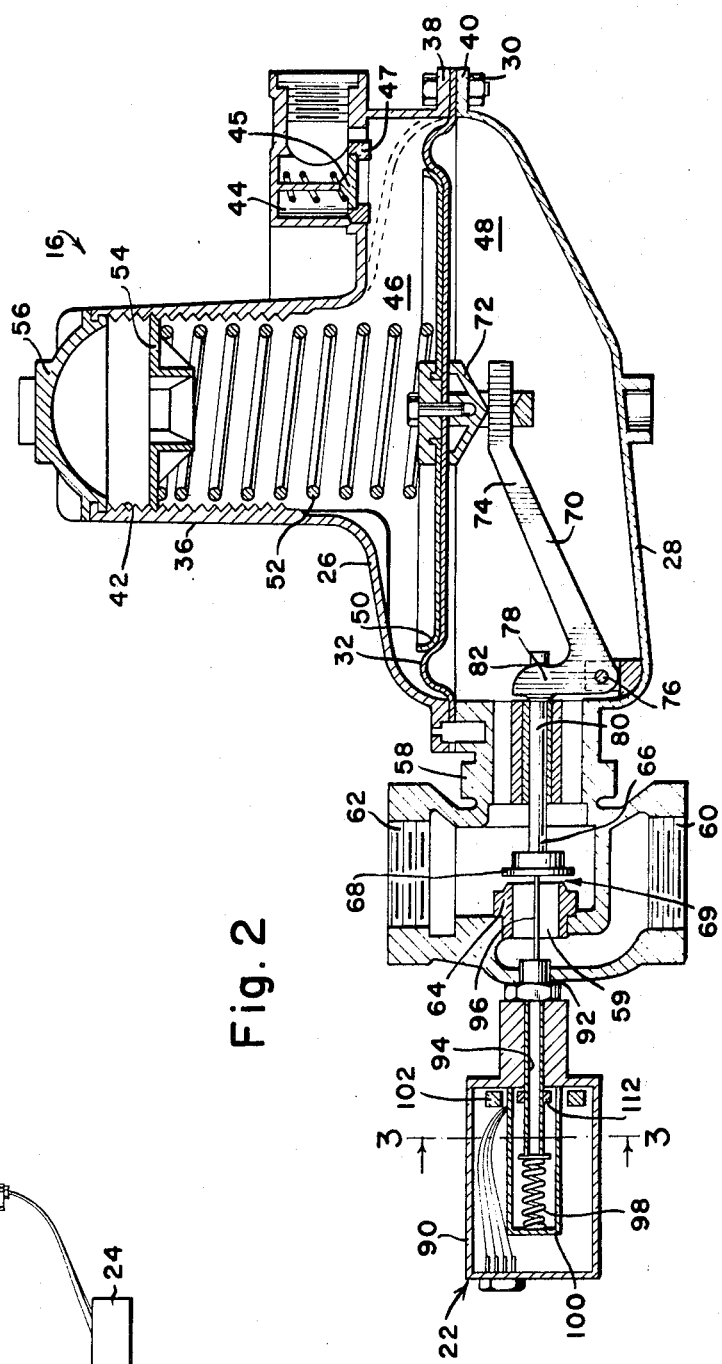
INVENTORS
John Van Dyke
Albert R. Milliron
BY
Curtis, Morris & Safford
ATTORNEYS

METHOD AND APPARATUS FOR CONTROLLING AND METERING GAS FLOW

This invention relates to a method and apparatus for metering the total volume of gas discharged from a gas supply line. In particular, the invention relates to a system for providing a flow of gas at a constant pressure to a point of consumption from a gas supply line through which gas flows at varying pressures which includes an apparatus for metering the total volume of gas consumed.

It is an object of the present invention to control the gas pressure and meter the flow of gas drawn from a gas supply line. It is another object to provide a metering system on a gas supply branch of a gas distribution system. Another object of the invention is to meter the total volume of gas drawn from a gas supply line with a high degree of accuracy to provide a basis for billing consumers. Another object of the invention is to provide a method of metering the rate of gas flow drawn from a supply line. It is a still further object of the present invention to meter the demand made by a gas consumer on a gas company's gas supply for any increment of time.

In accordance with the preferred embodiment of the invention, there is provided a gas control and metering regulator system in a gas supply line. Gas flows from a source thereof through a main transmission or distribution line to a plurality of branch supply lines. These branches serve to deliver the gas to distributors and consumers. The gas in these lines flows under varying pressures, and a control regulator is provided in the branch line to supply gas at an intermediate constant pressure downstream to an intermediate line or chamber. The intermediate constant pressure gas flows from the intermediate line through a metering regulator to a discharge line and thence to the consumer, and the metering regulator reduces the pressure to that desired by the consumer. The metering regulator includes a movable valve disc which cooperates with a fixed area valve seat to form a variable area annular orifice. The annular variable area orifice is a cylindrical opening the area of which may be calculated by multiplying the circumference of the fixed orifice by the linear distance the valve disc is removed from the valve seat. Thus, the valve disc is operative to vary the flow of gas through the orifice to maintain the constant pressure to the discharge line. When the inlet pressure to the metering regulator is constant, the position of the disc at any instant bears a fixed relationship to the rate at which the gas is flowing through the variable area orifice of the metering regulator.

The armature of an electrical transducer is mechanically connected to be moved as the valve disc moves in the metering regulator. The transducer is of the Hall-effect type which has a constant DC power input impressed across it and, as the position of the valve disc is changed in response to gas flow in the discharge line, the position of the armature in the core is also changed and thus varies the magnetic field therein. Varying the field varies the resistance of the Hall-effect element in the transducer and thus also varies the electrical characteristics thereof. These varying characteristics produce a varying output signal from the Hall-effect element which is a function of valve disc position and rate of gas flow.

An integrator and accumulator assembly receives the varying output signal and integrates the signal with time to compute, record and accumulate an indication of the total volume of gas which flows through the metering regulator. Thus, a highly accurate measuring system is provided on a gas flow supply line which is suitable for use as a basis for billing consumers, indicating instantaneous gas flow rate and the demand of a gas consumer for gas over an increment of time.

The construction of the preferred embodiment as well as the advantages thereof, which include accurate metering of the gas flow with simplicity of design and economy of manufacture will become further apparent from the following specification when considered in conjunction with the accompanying drawing wherein:

FIG. 1 is a somewhat schematic view of one embodiment of the invention;

FIG. 2 is an enlarged sectional view of the metering regulator and transducer; and FIG. 3 is a sectional view on line 3—3 of FIG. 2.

With reference now to FIG. 1 of the drawings, there is illustrated a gas flow metering system 10. A branch supply line 18 extends from a main distribution line to a control regulator 12 which is connected by an intermediate conduit 14 to a metering regulator 16, from which the gas flows through a discharge line 20 to the point of consumption.

Control regulator 12 receives gas from the supply line at varying pressures and operates to maintain a constant discharge pressure through the intermediate conduit 14. Metering regulator 16 receives the constant intermediate pressure gas flow from the conduit 14 and supplies gas to the point of consumption through the line 20 at a constant pressure which is somewhat lower than the intermediate pressure in conduit 14 and regulator 12.

The metering regulator 16 includes a valve element 66, as seen in FIG. 2, which is movably mounted and adapted to control the pressure of gas delivered by the metering regulator. When the gas pressure in the intermediate line 14 is held constant, the position of the element 66 at any instant is proportional to the rate of gas flow through the valve at that time. An electrical transducer 22 is operatively connected to the valve disc and produces a varying output signal in response to disc movement, which signal is thus a function of the rate of gas flow. The transducer is connected to an electrical integrator and recording system 24 which is operable to integrate the transducer output signal with time and totalize the signal in terms of volume of gas with sufficient accuracy to provide a basis for billing the recipient of gas flowing through the regulator.

The control and metering regulators are of similar construction, thus only the structure of the metering regulator 16 is illustrated and described in detail.

The body of the regulators is formed by two casing members 26, 28 having peripheral flanges 38, 40, respectively, which are fastened together in superimposed relation by means of the bolt and nut assemblies 30.

The casings are generally dish-shaped and a flexible diaphragm 32 is disposed between them and clamped in place by the peripheral flanges 38, 40. The flanges and peripheral edge of the diaphragm cooperate to form a gastight seal between the casings.

Casing 26 includes an extension 36 at its apex which has a threaded bore 42 therein. A vent 44 including a spring-biased valve member 45 which seats in a valve opening 47 is provided in the casing 26. Vent 44 opens to the atmosphere whereby the casing 26 and diaphragm 32 cooperate to form a vent chamber 46. Secured to the vent side of the diaphragm 32 is a strengthening pan 50 adapted to receive in bearing relation the end of a regulator adjustment spring 52. Spring 52 extends into the axially threaded bore 42 and an adjusting cap 54 engages the end of the spring within the bore. Cap 54 has a threaded periphery and is adapted to be threaded into and out of the bore whereby the compression of the spring 52 may be varied so that a desired bias load or reference force may be placed on the diaphragm. After the adjustment of the spring 52 has been set to the desired pressure reference, a protective cap 56 is threaded into the top of extension 36 which is effective to close the bore 42 and prevent tampering with the adjusting cap or spring.

The diaphragm 32 cooperates with the casing 28 to form a pressure chamber 48. A valve chamber member 58 including a gas inlet port 60 and a gas outlet port 62, is formed on the periphery of the casing 28 and communicates with the pressure chamber 48. A passage 59 is formed in the valve chamber 58 between the inlet and outlet ports 60, 62 to permit regulation of gas flow from port 60 to the chamber 48 and port 62. An annular valve seat member 64 is provided on the periphery of the passage 59, and a valve element 66 including a valve disc 68 is operatively associated with the valve seat 64 for controlling gas flow through the passage from the inlet to the outlet ports. A gas control zone providing a control orifice 69 is defined between the valve disc 68 and seat member 64 within the valve chamber 58 and is an extension of passage 59 to the seating surface 64. The rate of flow of gas through the passage 59 is controlled by the relative size of this orifice; thus by moving the valve element 66 with respect to the passage 59 the size of the gas-flow control zone, and the size of the orifice 69, is varied to regulate the flow of gas into the pressure-sensing chamber 48 and out of the port 62. The disc 68 is adapted to engage the seat 64 and form a gastight seal therewith to prevent gas flow to the outlet 62 when there is no gas flow in discharge line 20.

Movement of the valve 66 is controlled by movement of the diaphragm 32 in response to pressure variation in the pressure chamber 48 and the outlet passage 62. A linkage system 70 is connected between the diaphragm 32 and the valve element 66 to effect a transfer of motion from the diaphragm to the valve.

The system 70 includes a base member 72 fixed to the pressure side of the diaphragm 32 and has an offset leg portion 74 pivotably attached to the interior of casing 28 at 76. Another leg portion 78 is connected at its free end to valve stem 80 of valve element 66 at 82. Thus, any motion of the diaphragm 32 will be transmitted to linkage system 70 and will in turn be effective to move the valve element 66 into and out of engagement with the valve seat.

The operation of the control regulator will now be discussed.

The spring 52 is adjusted by means of the cap 54 to impose an initial bias or reference force on the diaphragm 32 through the strengthening pan 50. This downward bias is effective through the linkage system 70 to open the valve, i.e., move the valve element 66 away from the seat 64, whereby to admit a predetermined gas pressure into the intermediate pressure-sensing chamber 48 of the control regulator and permit gas at a controlled pressure to flow through its outlet port 62. Gas pressure in the supply line 18 tends to vary from time to time, thus, if not controlled, this would vary the pressure above the constant pressure desired in the outlet port 62 of the control regulator and the intermediate conduit 14 as determined by the initial bias imposed by the spring 52, the diaphragm 32 will respond by moving upwardly as seen in FIG. 2, against the spring 52. As the diaphragm moves upwardly, the linkage system 70 causes the valve 66 to move closer to its seat 64 whereby to decrease the size of the orifice 69 and rate of gas flow, i.e., the volume of gas flowing in a given period of time, through the passage 59 and orifice 69 into the intermediate chamber 48 to effectively reduce the pressure therein and thus maintain a constant outlet pressure. On the other hand, should the pressure in outlet port 62 and line 14 decline below the predetermined pressure, the pressure in the intermediate chamber 48 would correspondingly drop. As a result of the decrease of pressure in intermediate chamber 48 resistance to the expansion of the spring 52 will be decreased and thus the diaphragm will move downwardly and through the linkage system 70 cause the valve 66 to move away from its seat 64 to permit an increased gas flow into the regulator chamber 48. This increased flow increases the pressure in the chamber 48 until the initial bias pressure imposed by spring 52 is attained. Thus, the predetermined intermediate constant pressure at outlet 62 and in intermediate conduit 14 is maintained.

If gas is not continuously drawn from the system, pressure in the chamber 48, outlet port 62 and conduit 14 will increase to a point where the passage 59 is completely closed by the valve disc 68 and gas flow into the system is prohibited.

It has been found that if a constant pressure is supplied to the inlet port of a regulator of this type, the regulator may function as a measuring instrument since the distance between the valve disc face 68 and the valve seat 64 and thus, the size of the orifice 69, is proportional to the volume of gas flowing through the orifice under the predetermined constant pressure.

Thus, a second regulator 16 is interposed between the control regulator 12 and the consumers takeoff conduit or discharge line 20. The intermediate conduit 14 supplies the intermediate constant gas pressure from the control regulator 12 to the inlet port 60 of the second or metering regulator 16.

The metering regulator 16 is substantially the same, structurally as the control regulator 12. However, it includes an electrical transducer 22 operatively connected to the valve disc 68 for converting the movement of the valve element 66 to an electrical signal.

In the preferred embodiment illustrated in FIG. 2, a transducer 22 is shown which has an outer housing 90 and is attached to the valve chamber 58 adjacent the inlet port 60 at a position 92 which is directly opposite and concentric with the passage 59 and valve seat 64. An armature 94 is slidably mounted within the transducer and includes a shaft member 96 which extends into the chamber 58 and through the passage 59 for connection to the valve disc 68. While the connection between members 96, 68 may be formed by any suitable mechanism, in the illustrated embodiment the armature is biased against the disc 68 by spring member 98. The armature is enclosed by a shield member 100 which prevents gas leakage and which provides a bearing surface for the spring 98. Thus, as the valve element 66, of the metering regulator 16 moves in response to varying gas demand, as will be more fully explained hereafter, the transducer armature 94 is correspondingly moved. Since the position of the valve element is proportional to the size of and gas flow rate through the variable area annular orifice 69, the relative position of the armature will be a function of these parameters.

In the preferred embodiment of this invention, a Hall-effect transducer is utilized. This type of unit operates on the well-known principle that when a thin plate of resistive metal is exposed to a magnetic field, its resistance will vary in proportion to the strength of the field. Thus, for example, if a constant DC control current input is placed on a Hall-effect element as a surrounding magnetic field is varied, the element will produce electrical signals which will vary in proportion to the magnetic field. These signals comprise a varying DC output current and a varying voltage across the element.

In the specific transducer 22 illustrated, there is provided a generally torodially-shaped core 102 formed of a ferrite material. The core has two pole faces 104, 106 and has electrical windings about its periphery which are connected to a DC source whereby a magnetic field is created across the airgap 108. A conventional Hall-effect element or plate (not shown) which is relatively thin and generally rectangular in shape is positioned on one of the pole faces. A pair of leads 109 and 110 are connected to the opposite ends of the plate to provide for a constant current input thereto. The armature 94 is situated in the airgap 108 between the poles 104, 106 and includes magnets 112 on its periphery.

As the armature is moved with valve element 66, the magnets 112 will cut more or less of the magnetic flux lines in the airgap 108 between the poles 104, 106 and thus vary the magnetic field to which the Hall-effect element is subjected. As previously noted, the resistance of the element varies with the field and thus the constant current input is converted to a variable output signal. This signal is a function of the volume of gas flowing through the passage 59 and variable area orifice 69 since the position of the valve element 66 and the position of armature 94 are a function of that rate of flow.

The variable output current from the transducer is direct current and may be "totalized," i.e., the current flow may be accumulated and totaled with a high degree of accuracy. This total may then be used as a basis for billing the consumer as it will be proportional to the total gas flow through the metering regulator.

Totalization is effected by the signal integration and recording system 24, indicated in FIG. 1. That system utilizes a charging capacitor receiving the output current flow of the transducer as a time base, for integrating the signal with time, and a comparator circuit to pulse an electromechanical counter which records the signal in terms of volume of gas and provides a visual readout thereof.

The operation of the metering regulator, transducer, and integrator will now be discussed.

The valve disc 68 in the metering regulator 16 is set by means of the adjusting spring 52 and linkage system 70 a predetermined distance from the valve seat 64 to permit a predetermined base pressure in chamber 48, and that pressure is somewhat lower than the intermediate pressure of the gas supplied from the intermediate conduit 14. As gas is withdrawn at varying flow rates from the system by the consumer through conduit 20 from the outlet 62 of the metering regulator, the pressure within the chamber 48 will tend to vary correspondingly. However, the diaphragm 32 and linkage system 70 in the metering regulator operate to move valve 66 in the appropriate manner to let more or less gas flow through orifice 69 and thereby maintain the desired constant pressure in chamber 48 and at outlet 62, as the volume or rate of gas flow through conduit 20 fluctuates. The position of the valve element 66 with respect to the valve seat 64 determines and is a function of the area of the variable area annular orifice 69 and the rate of gas flow therethrough, when the gas inlet and outlet pressures at the orifice are held constant at their predetermined pressure valves. This position is translated through the armature 94 to produce a varying electrical output signal as discussed above. This signal is then utilized by the integration and recording system 24 for totalizing the flow of gas through the metering regulator.

The transducer 22 is also provided with a bead thermistor which is used in areas having wide temperature variations. The thermistor is placed in the gas stream in outlet port 62 in an area so that it is sensitive to the temperature of the delivered flowing gas and transmits an additional electrical input signal into the integrator circuit of the integration system 24 to automatically correct variations in the gas temperature.

The invention is adaptable to function in additional ways and with other equipment. It is contemplated that a readout of the instantaneous rate of gas flow can be monitored. Since the voltage across the Hall-effect element also varies as the magnetic field in the transducer is varied this voltage will be proportional to the rate of gas flow through the orifice at any instant of time. A voltmeter may then be used to monitor this voltage through the leads 114, 116. The meter may be calibrated to provide a reading in volume of gas per unit of time to determine the instantaneous rate of flow of gas through the orifice 69 or a metering system can also be provided which would indicate the volume of gas used over any desired increment of time.

A metering system is thus provided which will totalize the flow of gas through a regulator as it is supplied to a consumer from a branch supply line in a distribution system. The metering regulator measures the total gas volume to a high degree of accuracy such that its reading may be used as a basis for billing the consumers. This is accomplished by one measurement which is then directly interpretable into a measurement of flow rate through the use of two pressure regulators in the gas distribution system.

What is claimed is:

1. A gas-metering system comprising, a metering regulator having a gas inlet port and a gas discharge port, means for supplying gas under constant pressure through said inlet port to said regulator, valve means between said inlet and discharge ports including an orifice through which gas flows from said inlet port to said discharge port and a movable valve element operative to vary the rate of gas flow through said orifice, means for controlling the position of said valve element in response to gas pressure variations in said discharge port whereby a predetermined gas pressure is maintained in said discharge port and the position of said valve element determines the rate of gas flow through said orifice, and metering means adapted to measure and record the rate of gas flow through said orifice as a function of the relative positions of said valve element, said metering means including a Hall-effect transducer having an armature operatively connected to said valve element to move simultaneously therewith whereby the output signal of said Hall-effect transducer is varied in accordance with the rate of gas flow through said orifice.

2. A system as described in claim 1 wherein said metering means includes integrator means operatively connected to said transducer for integrating said signal with time and thereby determining the total amount of gas flow through said orifice.

3. A system as described in claim 2 wherein said metering means includes means operatively connected to said integrator means for recording the integrated transducer output signal and providing a readout of said signal in terms of the total amount of gas flow.

4. A system as described in claim 1 wherein said metering means includes means operatively connected to said transducer for measuring the instantaneous rate of gas flow through said orifice.

5. The system as described in claim 1 wherein said armature includes shaft means extending through said orifice and mechanically connected to said valve element.

6. A system as described in claim 1 wherein said metering means includes means operatively connected to said transducer for measuring the demand of gas flowing through said orifice over an increment of time.

7. A gas supply and metering system for distributing gas from a supply line in which gas flows at varying pressures to a gas discharge line at a constant pressure, comprising, control regulator means for receiving gas from said supply line and discharging gas therefrom at a constant predetermined pressure, metering regulator means having a gas inlet port adapted to receive said constant pressure flow of gas from said control regulator and a gas outlet port adapted to discharge gas from said metering regulator to said discharge line, valve means operative between said ports for regulating the flow of gas therebetween, means in said regulator for operating said valve means in response to gas pressure in said discharge line to control the amount of gas discharged from said outlet port to said discharge line whereby movement of said valve means is a function of changes in the rate of gas flow between the ports, and transducer means operatively connected to said valve means for measuring and recording the rate of gas flow from said inlet port to said outlet port.

8. The regulator as defined in claim 7 wherein said valve means includes a valve seat member and a valve disc on said valve element in facing relation to said valve seat member whereby movement of said valve disc in relation to said valve seat member controls the flow of gas through said orifice and said measuring and recording means includes an armature mechanically connected to move simultaneously with said valve disc.

9. The regulator as defined in claim 8 wherein said measuring and recording means further includes means for totalizing the gas flow through the orifice.

10. A gas-metering regulator including a gas inlet port and a gas outlet port, a valve means operatively located between said ports for regulating gas flow therebetween, said valve means having an orifice and a movable valve element operative to control gas flow through the orifice, means for moving said valve element to produce gas flow variations through said outlet port whereby the flow between the ports is varied to maintain a constant gas pressure at said outlet port, and means operatively connected to said valve element for measuring and recording the rate of gas flow through said orifice whereby as gas is introduced to said inlet port the position of said valve element is a function at the rate at which gas flows between said ports, and said measuring and recording means determines the volume of gas flowing through the orifice as a function of the position of said valve element.

11. The regulator as defined in claim 10 wherein said measuring and recording means includes a Hall-effect transducer wherein movement of said armature is effective to vary the output signal of said transducer in proportion to the relative position of said valve disc and rate of gas flow.

12. The method of metering the gas flow through a line in a system of the type wherein there may be variations in the gas pressure in the supply line and it is desirable to maintain a predetermined uniform pressure in the gas discharge line comprising, the steps of, restricting the gas flow from the supply line to an intermediate chamber, controlling said restricting to maintain a predetermined gas pressure in said intermediate chamber at a value which is greater than the desired pressure in said discharge line, providing restricted gas flow from said intermediate chamber to said discharge line through a control orifice, regulating the size of said orifice to maintain said predetermined pressure in said gas discharge line, producing a metering signal having a characteristic which varies with the size of said orifice and integrating said characteristic of said signal with time to produce a readout total of the gas flow.

* * * * *

UNITED STATES PATENT OFFICE
CERTIFICATE OF CORRECTION

Patent No. 3,633,416          Dated January 11, 1972

Inventor(s) John Van Dyke and Albert R. Milliron

It is certified that error appears in the above-identified patent and that said Letters Patent are hereby corrected as shown below:

In the heading, correct the spelling of the inventor's name as follows:

--[72] Inventors  John Van Dyke;
                        Albert R. Milliron, both of
                        Columbus, Ohio Signed and sealed this 13th day of November 1973.

(SEAL)
Attest:

EDWARD M. FLETCHER, JR.          RENE D. TEGTMEYER
Attesting Officer                  Acting Commissioner of Patents